W. N. GANDY.
CLAMPING DEVICE FOR PLOW STOCKS AND HANDLES.
APPLICATION FILED APR. 20, 1915.
1,154,754. Patented Sept. 28, 1915.
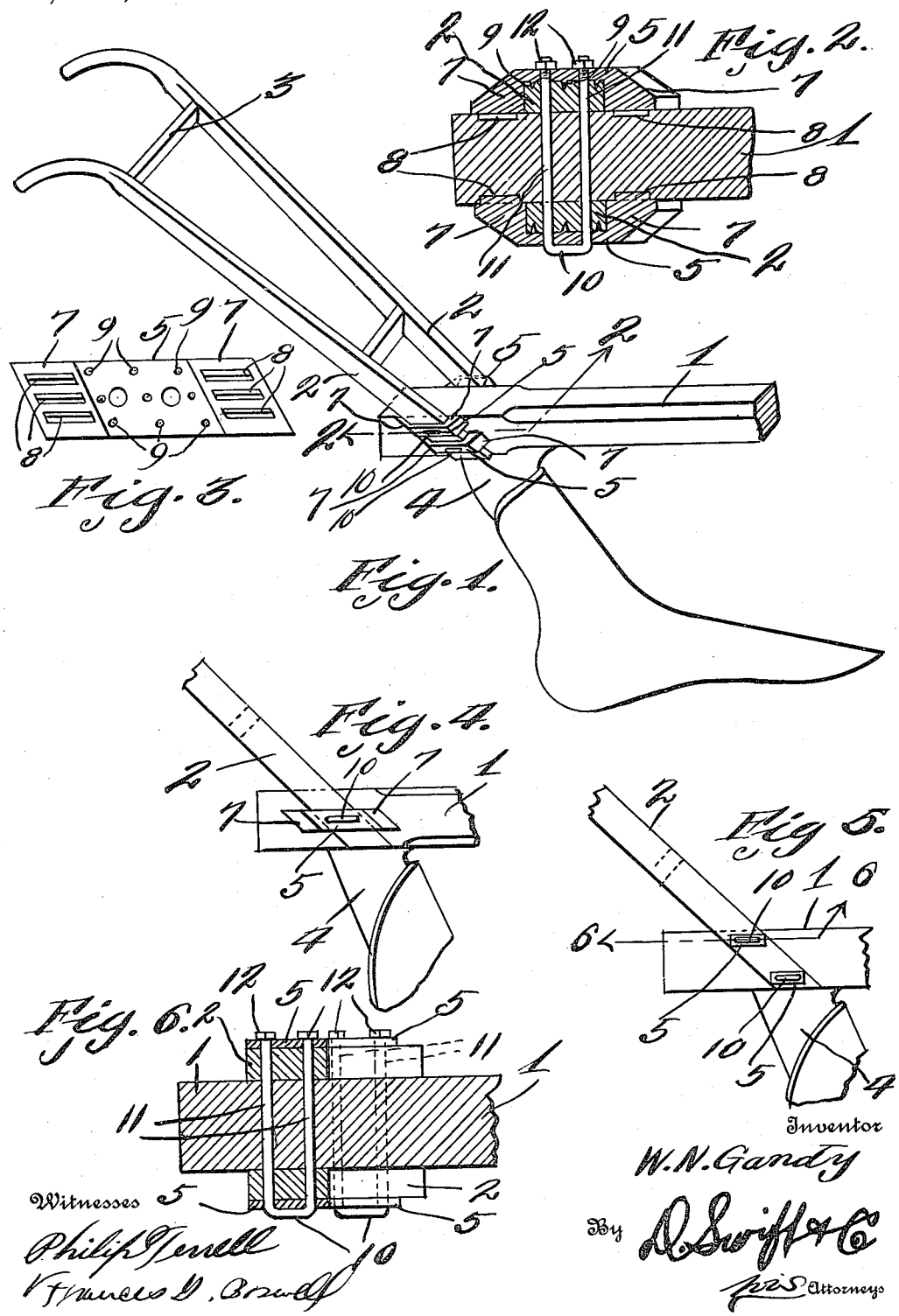

UNITED STATES PATENT OFFICE.

WILEY N. GANDY, OF ATHENS, LOUISIANA.

CLAMPING DEVICE FOR PLOW STOCKS AND HANDLES.

1,154,754.　　　　　Specification of Letters Patent.　　Patented Sept. 28, 1915.

Application filed April 20, 1915. Serial No. 22,597.

*To all whom it may concern:*

Be it known that I, WILEY N. GANDY, a citizen of the United States, residing at Athens, in the parish of Claiborne and State of Louisiana, have invented a new and useful Clamping Device for Plow Stocks and Handles; and I do hereby declare the following to be a full, clear, and exact description of the invention, such as will enable others skilled in the art to which it appertains to make and use the same.

This invention relates to improved clamping device for plow stocks or beams and handles, and an object of the invention is to provide a clamping device of this nature including means for relieving the strain from the bolting means, and at the same time clamp the handles so firmly that they will withstand all the pressure required, in handling and guiding the plow.

In practical fields the details of construction may necessitate alterations, falling within the scope of what is claimed.

The invention comprises further features and combination of parts, as hereinafter set forth, shown in the drawings and claimed.

In the drawings:—Figure 1 is a view of a portion of a plow showing the improved clamping device as applied thereto for rigidly and firmly holding the handles in place. Fig. 2 is a sectional view on line 2—2 of Fig. 1. Fig. 3 is an enlarged detail view of one of the clamping plates. Fig. 4 is a view similar to Fig. 1 showing only one clamping device. Fig. 5 is a view of a portion of a plow showing a modified structure of clamping device for the plow handles. Fig. 6 is a sectional view on line 6—6 of Fig. 5.

Referring more especially to the drawings, 1 designates the beam of the plow, adjacent the rear portion of which and upon both sides thereof the handles 2 are arranged, diverging rearwardly and upwardly, as shown, and having their diverging portions connected by the bar 3. The plow is provided with the usual stock 4. Disposed upon the outside of each handle where it connects to the beam, and arching the handle are two plates 5, substantially U-shaped in cross section, and the angular ends of each plate are enlarged, and of the shape shown. Each angular end 7 where it engages the beam is provided with a broad flat engaging surface having teeth 8, to embed into the beam, to assist not only in preventing the plate from displacement, but also acting to relieve all lateral strains off the bolting means, in order that the handles may withstand the pressure required in handling and guiding the plow. That portion of each plate which arches the handle is provided with spurs 9 to embed into the handle, to assist further in holding the plate as well as the handle securely in position. Passing through said plates, and through the handle and the beam are U-shaped staples 10, the arms 11 of which are threaded, and which threaded portions receive nuts 12, for clamping the various parts into position.

In Figs. 5 and 6 the enlarged angular ends with the teeth are eliminated, and in lieu of which the plates are constructed flat as shown, and engage the outer faces of the handles.

It is to be understood that either one or two clamping devices may be employed, for example as shown in Figs. 1 and 4.

The invention having been set forth, what is claimed as new and useful is:—

1. In combination, a plow beam, a pair of handles therefor having their lower converged ends arranged adjacent to and upon opposite sides of the beam toward its rear end, plates adjacent the outer faces of the handle, staples passing through said plates, the handles, and the beam and provided with threaded means to hold the parts together, said plate being U-shaped and having enlarged angularly extending ends and engaging opposite edge portions of the handles, said enlarged angular ends having elongated teeth, which together with the angular ends relieve the strain upon the staples and hold the handles firmly in place.

2. In combination, a plow beam, a pair of handles therefor having their lower converged ends arranged adjacent to and upon opposite sides of the beam at its rear end, plates adjacent the outer faces of the handles and being angularly U-shaped to conform to the angular disposition of the handle, said U-shaped plate having enlarged angularly extending ends engaging opposite edge portions of the handle, said enlarged angular end having elongated teeth embedding into the beam, which together with the angular ends relieve the strain and hold the handles firmly in place, and staples passing through said plates, the handles, and the beam and provided with threaded means to hold the parts together.

In testimony whereof I have signed my name to this specification in the presence of two subscribing witnesses.

WILEY N. GANDY.

Witnesses:
J. W. HAYS,
W. M. GOUTT.

Copies of this patent may be obtained for five cents each, by addressing the "Commissioner of Patents, Washington, D. C."